US008785354B2

(12) United States Patent
Westelynck et al.

(10) Patent No.: US 8,785,354 B2
(45) Date of Patent: Jul. 22, 2014

(54) HYDRODEWAXED HYDROCARBON FLUID USED IN THE MANUFACTURE OF FLUIDS FOR INDUSTRIAL, AGRICULTURAL, OR DOMESTIC USE

(75) Inventors: Antoine Westelynck, Brueil en Vexin (FR); Christine Aubry, Marly le Roi (FR); Achim Wiessler, Melle (DE)

(73) Assignee: Total Marketing Services, Puteaux (FR)

( * ) Notice: Subject to any disclaimer, the term of this patent is extended or adjusted under 35 U.S.C. 154(b) by 104 days.

(21) Appl. No.: 13/255,279

(22) PCT Filed: Mar. 11, 2010

(86) PCT No.: PCT/FR2010/050426
§ 371 (c)(1),
(2), (4) Date: Sep. 8, 2011

(87) PCT Pub. No.: WO2010/103245
PCT Pub. Date: Sep. 16, 2010

(65) Prior Publication Data
US 2012/0010109 A1    Jan. 12, 2012

(30) Foreign Application Priority Data

Mar. 12, 2009 (FR) ..................................... 09/01155

(51) Int. Cl.
| C09K 8/03 | (2006.01) |
| C10L 1/16 | (2006.01) |
| C09D 11/12 | (2006.01) |
| C09K 3/00 | (2006.01) |
| C08K 5/01 | (2006.01) |
| C10M 107/02 | (2006.01) |
| C10M 101/02 | (2006.01) |
| C10L 5/36 | (2006.01) |
| C10L 11/04 | (2006.01) |
| C10G 45/58 | (2006.01) |
| C10G 65/04 | (2006.01) |
| C09K 8/34 | (2006.01) |

(52) U.S. Cl.
CPC ........... *C10M 101/02* (2013.01); *C10M 107/02* (2013.01); C10G 2300/1074 (2013.01); *C09D 11/12* (2013.01); C10G 2400/18 (2013.01); *C10L 5/361* (2013.01); C10M 2203/1025 (2013.01); C10G 2300/202 (2013.01); *C10L 11/04* (2013.01); C10M 2205/173 (2013.01); C10G 2400/10 (2013.01); C10N 2230/74 (2013.01); *C10G 45/58* (2013.01); *C10G 65/043* (2013.01); C10G 2300/301 (2013.01); *C09K 8/34* (2013.01); C10G 2300/304 (2013.10); C10G 2300/1055 (2013.01); C10G 2300/1011 (2013.01); C10G 2300/302 (2013.01)
USPC ............. 507/137; 252/364; 106/31.13; 585/1

(58) Field of Classification Search
CPC ............. C09K 8/03; C10L 1/16; C09D 11/12
See application file for complete search history.

(56) References Cited

U.S. PATENT DOCUMENTS

| 2,346,970 | A | | 4/1944 | Jones | |
| 5,096,883 | A | * | 3/1992 | Mercer et al. | 507/103 |
| 5,374,495 | A | | 12/1994 | Ata et al. | |
| 5,632,884 | A | | 5/1997 | Jamois et al. | |
| 5,833,839 | A | | 11/1998 | Wittenbrink et al. | |
| 5,906,727 | A | | 5/1999 | Wittenbrink et al. | |
| 6,416,657 | B1 | | 7/2002 | Fersing et al. | |
| 7,326,817 | B2 | | 2/2008 | Dunlop et al. | |
| 7,442,739 | B1 | | 10/2008 | Hatfield | |
| 7,528,197 | B2 | | 5/2009 | Masubuchi et al. | |
| 2001/0021747 | A1 | | 9/2001 | Masubuchi et al. | |
| 2005/0197256 | A1 | * | 9/2005 | Dunlop et al. | 507/103 |
| 2009/0014354 | A1 | | 1/2009 | Knuuttila et al. | |
| 2009/0111723 | A1 | | 4/2009 | Shibata et al. | |
| 2009/0203558 | A1 | * | 8/2009 | Barnes et al. | 507/277 |
| 2009/0270294 | A1 | | 10/2009 | Souchez et al. | |
| 2010/0137176 | A1 | | 6/2010 | Aoki et al. | |
| 2010/0154674 | A1 | | 6/2010 | Chaverot et al. | |
| 2010/0307428 | A1 | | 12/2010 | Behrendt et al. | |

FOREIGN PATENT DOCUMENTS

| DE | 258 495 | 7/1988 |
| WO | WO 02/086007 | 10/2002 |
| WO | WO 03/074634 | 9/2003 |
| WO | WO 03/074635 | 9/2003 |
| WO | WO 2004/009738 | 1/2004 |
| WO | WO 2008/033899 | 3/2008 |
| WO | WO 2008/138861 | 11/2008 |

\* cited by examiner

*Primary Examiner* — Randy Gulakowski
*Assistant Examiner* — Jeffrey Washville
(74) *Attorney, Agent, or Firm* — Harness, Dickey & Pierce, P.L.C.

(57) ABSTRACT

Hydrocarbon fluid which can be used in the composition of industrial, agricultural and household products, with a pour point of less than −15° C. according to ASTM standard D97, initial and final boiling points between 200 and 450° C., containing more than 50% by weight of isoparaffins and naphthenes up to at most 40% by weight, and constituted by a mixture of hydrocarbons obtained by distillation of hydrodewaxed gas-oil cuts with a boiling point greater than 200° C.

24 Claims, No Drawings

HYDRODEWAXED HYDROCARBON FLUID USED IN THE MANUFACTURE OF FLUIDS FOR INDUSTRIAL, AGRICULTURAL, OR DOMESTIC USE

CROSS-REFERENCE TO RELATED APPLICATIONS

This application is a National Phase Entry of International Application No. PCT/FR2010/050426, filed on Mar. 11, 2010, which claims priority to French patent application Ser. No. 09/01155, filed on Mar. 12, 2009, both of which are incorporated by reference herein.

BACKGROUND AND SUMMARY

The present invention relates to a hydrodewaxed hydrocarbon fluid, which can be used in the composition of industrial, agricultural fluids and household fluids. These include drilling fluids, lubricants for industry including the automotive industry, phytosanitary products, inks, fuels for domestic uses, extension oils for sealants, viscosity reducers for resin-based formulations, pharmaceutical compositions and food-contact compositions.

The chemical nature and the composition of the fluids known to a person skilled in the art vary considerably according to the envisaged application. Thus, the distillation range measured by ASTM D-86 or ASTM D-1160 (choice according to whether the required final boiling point is below or above 365° C.), the pour point, the viscosity, the density, the sulphur and aromatics contents, the density, the aniline point measured by ASTM D-611, the method of production of these hydrocarbons, in particular the nature of the fractionally distilled feedstock, and the flash point constitute important characteristics which make it possible to adapt them to these different applications.

These hydrocarbon fluids often have narrow boiling point ranges between the initial boiling point (IBP) and the final boiling point (FBP). These ranges are chosen according to the envisaged application. Their narrowness makes it possible to have a precise ignition point and/or flash point, an important parameter for safety reasons. A narrow cut range also makes it possible to obtain a better-defined viscosity, improved stability of the latter and evaporation characteristics suited to applications requiring a drying stage of controlled duration: it also promotes the production of hydrocarbon cuts with better-defined surface tension, the aniline point and solvent power of which are more precise. However this is not always necessary and other characteristics are to be given priority.

The purification typically consists of stages of hydrodesulphurization and/or hydrogenation to reduce the sulphur content and/or remove the aromatic hydrocarbons and/or unsaturated rings by converting them to naphthenes. The thus purified hydrocarbon fluids are mostly aliphatic, they contain paraffins, isoparaffins and naphthenes. If a dearomatized fluid is required, the hydrocarbon product which has been hydrodesulphurized, then fractionated can be hydrogenated in order to saturate all of the aromatic hydrocarbons which are present. The hydrogenation can also be carried out before the final fractionation. At present, users are essentially seeking hydrocarbon fluids containing low concentrations of aromatic hydrocarbons and with extremely low sulphur contents, the cuts of which have higher initial boiling points in order to take environmental or safety conditions into account.

The processes in which a gas-oil obtained by direct distillation under atmospheric pressure is first hydrotreated, make it possible to achieve cuts the final boiling point (FBP) of which is 320° C. Seeking higher final boiling points, for example above 350° C. encourages the formation of distilled cuts with higher sulphur contents and with a higher aromatic hydrocarbons content. The presence of such compounds in the hydrocarbons has harmful effects on the hydrogenation catalysts, shortening their life. Sometimes, a complementary hydrogenation treatment is necessary to further reduce the sulphur content of these products. Thus, the treatment of these cuts adversely affects in particular the economies of the hydrogenation methods by considerably increasing the consumption of hydrogen and the costs of renewing the catalyst which rapidly becomes deactivated.

Now, these hydrocarbon fluids must also exhibit a good compromise between a high viscosity and good low-temperature properties, i.e. a very low freezing point, for example below −20° C., a high solvent power, in particular for the printing-ink application requiring the dissolving of resins, but also viscous or solid compounds included in the composition of drilling fluids. These hydrocarbon fluids used as extension oils for the production of silicone-based sealants must exhibit good compatibility with silicone polymers and also the power to reduce the viscosity of certain polymers such as polyvinyl chloride or PVC polymers when they are used in the production of PVC pastes or plastisols.

It is also known to obtain these fluids from compounds originating from vacuum distillation, in particular of vacuum or steam-cracked gas-oils which can then be subjected to other processes such as catalytic cracking coupled with hydrogenation (hydrodesulphurization, hydrodearomatization) as described in the patent EP1447437 or also by steam cracking coupled with hydrogenation, as described in the patents WO03/074634 and WO03/074635. These steam cracking or catalytic cracking processes promote the concentration of aromatics, in particular of polycyclic aromatics in the 200 to 450° C. cuts leaving these units, these aromatics being converted to naphthenes, more particularly highly concentrated polycyclic naphthenes, by hydrogenation. However, the demand for new less toxic or less volatile fluids with a low viscosity have led professionals in the field to seek new bases for producing these fluids.

It should be recalled that the sought hydrocarbon fluids must satisfy certain purity specifications; the sulphur content measured by ASTM D-5453 must not exceed 10 ppm, preferably 5 ppm and frequently not exceed 1 ppm. Hydrocarbon fluids must normally have a low concentration of aromatic hydrocarbons and be constituted by cuts having a final boiling point greater than 320° C.

In order to diversify the bases which can be used as hydrocarbon fluids, the Applicant has chosen to use hydrocarbon cuts originating from units for the hydrodewaxing of different gas-oils cuts originating from other refining units and to distil them in order to produce from them hydrodewaxed fluids with suitable cut ranges, optionally after subjecting them to purification treatments in order to remove the sulphur and aromatic hydrocarbons. In the remainder of the present description, these hydrocarbon fluids will be called distilled deparaffinized hydrocarbon fluids or more simply hydrodewaxed fluids.

A subject of the present invention is therefore a hydrocarbon fluid which can be used in the composition of industrial and agricultural products, or products for domestic use, with a pour point less than −15° C. according to ASTM standard D97, initial and final boiling points comprised between 200 and 450° C., containing more than 50% by weight isoparaffins and naphthenes up to at most 40% by weight, and constituted by a mixture of hydrocarbons obtained by distillation of hydrodewaxed gas-oil cuts with a boiling point greater than 200° C.

The invention relates to hydrocarbon fluids the boiling point of which is comprised between 280 to 450° C., or between 200 and 325° C. The pour point of each of the fluids is less than −30° C. according to ASTM standard D 97. The sulphur content is less than 10 ppm, preferably less than 2 ppm. Each fluid contains less than 500 ppm of aromatics, the content being determined by UV spectrometry.

The hydrocarbon fluid originated from the hydrodewaxing of gas-oil type cuts obtained by atmospheric distillation, vacuum distillation, hydrotreatment, hydrocracking, catalytic cracking and/or visbreaking, or also products originating from the conversion of biomass, optionally after a desulphurization and/or complementary dearomatization treatment. It has a naphthenes content comprised between 20 and 40% and more than 60% isoparaffins. It preferably comprises more than 60% by weight of isoparaffins and less than 10% of normal paraffins.

In a first embodiment for fluids with a boiling point comprised between 280 and 450° C., the viscosity is greater than 5 mm$^2$/s at 40° C., and preferably greater than 7 mm$^2$/s at 40° C., according to ASTM standard D445. These fluids generally comprise less than 65% by weight hydrocarbons having a chain length comprised between 16 and 22 carbon atoms, and more than 30% by weight hydrocarbons having a chain length greater than 22 carbon atoms preferably with chains comprised between C22 to C30. Preferably, each of these fluids comprises less than 50% by weight hydrocarbons having a chain length comprised between 16 and 22 carbon atoms, and more than 40% by weight hydrocarbons having a chain length greater than 22 carbon atoms, preferably with a chain comprised between C22 and C30. Moreover, they are devoid of normal paraffins.

In a second embodiment, the fluids with a boiling point comprised between 200 and 325° C., have a viscosity of less than 3.5 mm$^2$/s at 40° C., according to ASTM standard D445 and contain no hydrocarbons with carbon chains greater than C22. The invention also relates to a composition of hydrocarbon fluids comprising the hydrodewaxed fluid mixed with non-hydrodewaxed fluid. The non-hydrodewaxed fluid originates from hydrocracked and hydrotreated cuts comprised between 200 and 400° C., with a cut range less than or equal to 70° C., and a naphthene content greater than 40%. The non-hydrodewaxed hydrocarbon fluids can also be obtained from severely hydrotreated gas-oils from distillation cuts comprised between 200 and 350° C. and with a sulphur content of less than 10 ppm. The composition of hydrocarbon fluids according to the invention comprises at least 40% by weight hydrodewaxed fluid.

The invention also relates to the use of at least one hydrodewaxed fluid alone or in a mixture in a composition as solvent in compositions of industrial and agricultural products, or products for domestic use. The invention relates to the use of at least one hydrodewaxed fluid or of a composition from cuts with boiling points comprised between 200 and 350° C., as drilling fluid included in the composition of muds. The invention relates to the use of at least one hydrodewaxed fluid or of a composition from cuts with boiling points comprised between 300 and 450° C. in the composition of phytosanitary products. The invention relates to the use of at least one hydrodewaxed fluid or of a composition of cuts with boiling points comprised between 280 and 450° C., and in particular comprised between 290 and 380° C., as a lubricating oil for metal working.

The invention relates to the use of at least one hydrodewaxed fluid or of a composition from cuts with boiling points comprised between 280 and 400° C., as solvent for resins and/or polymers, the final composition comprising from 5 to 95% of said fluid or said composition. The invention relates to the use of at least one hydrodewaxed fluid or of a composition of cuts with boiling points comprised between 280 and 380° C., in particular between 300 and 350° C., in the composition of silicone sealants or silicone adhesives. The invention relates to the use of at least one hydrodewaxed fluid or of a composition of cuts with boiling points comprised between 290° C. and 400° C., in particular between 330 and 380° C., in formulations based on polymers, in particular PVC (called plastisol) for producing building materials. The invention relates to the use of at least one hydrodewaxed fluid or of a composition of cuts with boiling points comprised between 290° C. and 380° C. in the composition of offset inks, in admixture with strongly oxidized bituminous compounds. The invention relates to the use of at least one hydrodewaxed fluid or of a composition of cuts with boiling points comprised between 280 and 400° C., in the composition of domestic fuels.

According to the invention, the hydrodewaxed hydrocarbon fluids can be used in the composition of industrial and agricultural products and products for domestic use. They have a pour point less than −15° C. according to ASTM standard D97, their initial and final boiling points are comprised between 200 and 450° C. They contain more than 50% by weight isoparaffins and have a naphthenes concentration of at most 40% by weight. They are constituted by a mixture of hydrocarbons obtained by distillation of hydrodewaxed gas-oil cuts with a boiling point greater than 200° C.

By industrial products is meant drilling fluids, lubricants for industry including the automotive industry, inks, extension oils for sealants, viscosity reducers for resin-based formulations. By agricultural and household products is meant pharmaceutical compositions, phytosanitary products, fuels for domestic uses, and food-contact compositions.

These fluids are essentially composed of hydrodewaxed hydrocarbons from a cut comprised between 280° C. and 450° C., or also between 200 and 325° C. Their pour point according to ASTM standard D97 is preferably less than −30° C. These fluids according to the invention have a sulphur content of less than 10 ppm, preferably less than 2 ppm and less than 500 ppm of aromatics, content determined by UV spectrometry.

These hydrocarbon fluids are obtained by hydrodewaxing of gas-oil type cuts obtained by atmospheric distillation, vacuum distillation, hydrotreatment, hydrocracking, catalytic cracking and/or visbreaking, or also products originating from the conversion of biomass, optionally after an additional treatment of desulphurization and/or removal of aromatics with a view to their purification in order to satisfy the requisite sulphur content and aromatic hydrocarbons content characteristics. Unlike hydrocracked fluids, the fluids used have a naphthenes content of less than 40%, and contain more than 60% isoparaffins. Typically, the average naphthene contents vary from 20 to 40% by weight. Preferably, the fluids according to the invention contain more than 65% by weight isoparaffins and less than 10% of normal paraffins. More particularly, the viscosity of the fluids according to the invention with a boiling point comprised between 280 and 450° C., is greater than 5 mm$^2$/s at 40° C., and preferably greater than 7 mm$^2$/s at 40° C., according to ASTM standard D445.

Moreover, these fluids comprise less than 65% by weight hydrocarbons having a chain length comprised between 16 and 22 carbon atoms, and more than 30% by weight hydrocarbons having a chain length greater than 22 carbon atoms. More particularly fluids comprising less than 50% by weight hydrocarbons having a chain length comprised between 16 and 22 carbon atoms, and more than 40% by weight hydrocarbons having a chain length greater than 22 carbon atoms are preferred. In this preferred embodiment, the fluid is virtually devoid of normal paraffins.

Unlike the fluids with a boiling point comprised between 280 and 450° C., the fluids according to the invention with a boiling point comprised between 200 and 325° C. have a viscosity according to ASTM standard D445 of less than 3.5 mm$^2$/s at 40° C., and contain no hydrocarbons with carbon chains greater than C22. Unlike the fluids of the prior art, narrow distillation cuts are not sought, but rather cuts exhibiting a compromise between a high viscosity and a very low pour point. These fluids are particularly advantageous in that their pour point is always less than −30° C. thus encouraging their use at low temperatures. This characteristic makes them particularly suitable for uses where the storage and utilization temperature can be very low.

Another embodiment of the invention is the use of the hydrodewaxed fluids in a composition of fluids mixed with non-hydrodewaxed fluids from distillation cuts comprised between 200 and 400° C. with a distillation range less than or equal to 70° C. and a naphthenes content generally greater than 40%, in the target uses for these hydrodewaxed fluids. The non-hydrodewaxed fluids include fluids obtained by steam cracking and hydrotreatment from distillation cuts comprised between 200 and 400° C. with a cut range less than or equal to 70° C. and a naphthenes content greater than 40% and preferably greater than 60%.

Other fluids which can be used mixed with the hydrodewaxed fluids for these same applications mentioned previously, are constituted by highly hydrotreated gas-oils from distillation cuts comprised between 200 and 350° C., with a sulphur content of less than 10 ppm, and aromatics content of less than 0.1%. These hydrocarbon fluids can originate from the refining of sources of fossil hydrocarbon but also of hydrocarbons of vegetable or animal origin which are subjected to fractionation and purification treatments and the distillation ranges and cuts of which correspond to those of the fluids obtained from hydrocarbons of fossil origin. These hydrocarbon fluids or the compositions which contain them can thus be used in the formulation of drilling fluids, industrial lubricants, fluids for metal working, phytosanitary products, intended in particular for the treatment of diseases for certain crops, inks, coloured or uncoloured, scented or unscented oils used in oil lamps or garden torches, in the formulations used as fuel for domestic equipment such as barbecues and also as extension oils in the composition of sealants, for example siliconized, and as viscosity reducers in polyvinyl chloride (PVC) formulations.

Thus, the hydrodewaxed hydrocarbon fluids from distillation cuts comprised between 200 and 325° C. or compositions of fluids are used in the composition of drilling fluids. They can constitute the organic phase of a drilling mud constituted by an oil emulsion/aqueous phase to which various additives specific to the application are added. For offshore or onshore uses, drilling fluids must exhibit acceptable biodegradability, satisfactory eco-toxicity and low bioaccumulation. For these applications the fluid must generally have a viscosity of less than 3.5 mm$^2$/s at 40° C., a flash point of more than 100° C. and a pour point of −40° C. or less for "thermofrost" us applications. Such properties were accessible only by using expensive synthetic fluids such as hydrogenated polyalphaolefins, unsaturated internal olefins, linear alphaolefins and esters.

The hydrodewaxed hydrocarbon fluids from distillation cuts comprised between 280 and more than 450° C. or compositions of fluids are used in the composition of phytosanitary products, in particular as solvent vector allowing spraying on fruit trees and fields of crops. The hydrodewaxed hydrocarbon fluids from a distillation cut comprised between 280 and 450° C., preferably between 290 and 380° C. or composition of fluids are also used as lubricating oil for metal working, irrespective of the width of the cut. The scope of the invention would not be exceeded by the use of these hydrocarbon fluids of the invention as light-grade industrial lubricants (hydraulics, gears, turbines etc.), automotive lubricants (gearbox, shock absorber oil etc.).

It is also possible to use fluids from distillation cuts comprised between 280° C. and 400° C. or a composition of fluids as solvent for resins and/or polymers, the final composition comprising from 5 to 95% of said fluid according to the invention. The solvent power of the fluid or of the composition which contains it allows in particular its use for viscosity reduction and liquefaction of resins such as the following: a) acrylic thermoplastic; b) acrylic thermosetting; c) chlorinated rubber; d) epoxides (in one or two parts); e) hydrocarbons (e.g. olefins, terpene resins, rosin esters, petroleum resins, coumarone-indene, styrene butadiene, styrene, methyl styrene, vinyltoluene, polychlorobutadiene, polyamide, polyvinyl chloride and isobutylene); f) phenolic; g) polyester and alkyd; h) polyurethane; i) silicone; j) urea; and, k) vinyl and polyvinyl acetate polymers.

More particularly, the hydrocarbon fluid or composition of fluids from a distillation cut range comprised between 280 and 380° C., preferably comprised between 300 and 350° C. is advantageous in the composition of silicone sealants or silicone adhesives, products for which it is strongly recommended to have cold-resistant products. Moreover, the hydrocarbon fluid or composition of fluids from a distillation cut comprised between 290° C. and 400° C., preferably between 330 and 380° C. is used in formulations based on polymers, in particular PVC (called plastisol) for producing building or decorative materials such as floor coverings, sealants, simulated leather, wallpapers and for coating wires or textiles (blinds, sails or tarpaulins etc.). Hydrocarbon fluids from distillation cuts comprised between 290° C. and 380° C. or a composition of fluids are particularly useful in the production of so-called "coldset" newsprint offset inks, in admixture with strongly oxidized, very hard bituminous compounds, preferred compositions being able to comprise more than 45% bituminous compounds and more than 40% of these fluids.

These hydrocarbon fluids can also be used as domestic fuels on their own (oil lamps, garden torches) or in combination with other compounds in the liquids, gels or briquettes used for lighting barbecues. For the latter applications, mixtures of at least one fluid from a distillation cut range comprised between 280 and 380° C. with at least one hydrocarbon fluid with a flash point less than 100° C. are used, these mixtures having a viscosity greater than 7 mm$^2$/s according to ASTM D445. They are used as they are or serve as a fuel base for domestic use. They have the characteristic of avoiding R65 labelling ("Harmful: may cause lung damage if swallowed").

DETAILED DESCRIPTION

The advantages of the present invention are described in the following examples, which illustrate and do not limit the invention

Example 1

The present example describes the different hydrodewaxed fluids which can be used and their characteristics in a mixture with conventional fluids. Thus, Table 1 below shows the hydrodewaxed fluids which can be used according to the invention referenced Di and conventional fluids with which they can be used in a mixture, these fluids being referenced Ti. The intrinsic properties of each fluid are mentioned there. These fluids can also be used in phytosanitary (D4), drilling (D5) or sealants (D6) applications.

TABLE 1

| | Test method | Unit | T1 | T2 | T3 | T4 | D1 | D2 | D3 | D4 | D5 | D6 |
|---|---|---|---|---|---|---|---|---|---|---|---|---|
| Initial boiling point | ASTM D86 | °C. | 182 | 233 | 201 | 305 | 289 | 334 | 295 | 305 | 225 | 301 |
| Final boiling point | ASTM D86 | °C. | 216 | 264 | 239 | 347 | 373 | 378 | 380 | 380 | 325 | 348 |
| Distillation range | | °C. | 34 | 31 | 38 | 42 | 84 | 44 | 85 | 75 | 100 | 47 |
| Viscosity at 20° C. | ASTM D445 | mm$^2$/s | 1.7 | | | 2.4 | 11 | 17.7 | 21.4 | 13.0 | — | 3.8 | — |
| Viscosity at 40° C. | ASTM D445 | mm$^2$/s | | 2.3 | 1.7 | 6.1 | 7.7 | 10.6 | 7.1 | 8.5 | 2.5 | 6.1 |
| Pour point | ASTM D97 | °C. | <−30 | <−20 | <−30 | −2 | −42 | −35 | −18 | −36 | −36 | −48 |
| Flash point | ASTM D93 | °C. | 65 | 103 | 76 | 159 | 149 | 175 | 151 | 157 | 99 | 158 |
| Density at 15° C. | ASTM D4052 | kg/m$^3$ | | | | 815 | 823 | 825 | 822 | 824 | 801 | 820 |
| Distribution of carbons | ASTM D2887 | wt. % | | | | | | | | | | |
| <C16 (C11-C15) | | | 100 | 94 | 100 | 0 | 8.0 | 0.5 | 4.1 | 0.1 | 61.4 | 2.5 |
| C16-C22 | | | 0 | 6 | 0 | 90.1 | 48.8 | 20.7 | 62.8 | 44.6 | 38.6 | 81.9 |
| >C22 (C23-C30) | | | 0 | 0 | 0 | 9.9 | 43.2 | 78.8 | 33.1 | 55.3 | 0 | 15.6 |
| Composition | GC MS | wt. % | | | | | | | | | | |
| isoalkanes | | | 24.9 | 30.5 | 26.8 | 59.0 | 73.1 | 65.7 | 69.5 | 75.5 | 62.6 | 62.2 |
| n alkanes | | | 21.3 | 24.0 | 5.3 | 8.3 | 0 | 0 | 5.5 | 0 | 9.7 | 0 |
| cycloalkanes | | | 53.8 | 45.5 | 67.9 | 32.7 | 26.9 | 34.3 | 25.0 | 24.5 | 27.7 | 37.8 |
| aromatics | | | 0 | 0 | 0 | 0 | 0 | 0 | 0 | 0 | 0 | 0 |

D3 is a mixture of 70% D1 and 30% T4.

Example 2

This example shows the characteristics of the products obtained with the isodewaxed fluids Di alone or in a mixture with conventional fluids Ti.

Fuel Composition for Use in Oil Lamps:

84.4% D2 is mixed with 15.6% T3 to give a product with a kinematic viscosity at 40° C. of 7.2 mm$^2$/s used as fuel for oil lamps or as a base for the production of barbecue lighters in the form of gels or solid blocks. The mixture is not R65-labelled thanks to its viscosity being greater than 7 mm$^2$/s at 40° C.

Ink Composition for Coldset Inks Application:

The solution obtained by mixing 42% D1, 54% type B1 oxidized bitumen (with characteristics given in Table 2 below) and a type H1 heavy aromatic oil is used in the formulation of a coldset black ink for newsprint. The characteristics of the solution of bitumen obtained (SB1) used in the inks are given in Table 3 below in comparison with reference products (Ri) commonly used for this same application but formulated on the basis of naphthene-type oil.

TABLE 2

| | Unit | Method | H1 | B1 |
|---|---|---|---|---|
| Penetration at 25° C. | 1/10 mm | EN 1426 | — | 0-6 |
| Ring and ball temperature | °C. | EN 1427 | — | 90-100 |
| Flash point COC | °C. | EN ISO 2592 | 303 | 300 |
| Density at 25° C. | Kg/m3 | EN ISO 3838 | 1002 | 1060 |
| Viscosity at 100° C. | mm$^2$/s | ISO 3104 | | 75 |
| Aniline point | °C. | ISO 2977 | | 59 |

TABLE 3

| Characteristic | Unit | Method | R1 | R2 | R3 | SB1 |
|---|---|---|---|---|---|---|
| Viscosity | mPa·s | Duke 25° C. 2500 s−1 | 11.8 | 13.5 | 11.2 | 11.5 |
| Tack | | Tackometer 0.4 ml, 30° C., 100 m/min after 1 minute | 140 | 145 | 141 | 144 |
| | | After 20 minutes | 157 | 160 | 161 | 157 |
| Low-shear viscosity | Pa·s | 20° C. | 220 | 123 | 60 | 100 |
| Formation of mist | 0 = poor 10 = correct | 40° C. 0.5 cc tackometer | 5 | 5 | 6 | 5 |
| Opacity | 0 = poor 10 = correct | Visual | 5 | 3 | 1 | 3 |

Lubricant Composition for Metal Working:

In this composition, 83% lubricant is introduced in the presence of 7% by weight of a set of high-performance additives composed of an anti-wear ZnDTP mixed with a sulphide-type sulphurized compound, an extreme-pressure additive of calcium sulphonate type, an overbased detergent of calcium sulphonate type, an adhesion agent, a copper-corrosion inhibitor and finally an antifoaming agent. Table 4 below shows the results obtained in terms of performances, the viscosity not being adjusted for a particular grade. It is noted that D1 and D3 give good anti-wear and extreme-pressure performances, and less foaming than that observed with paraffin or naphthene oils.

TABLE 4

| Characteristics | Method | Units | D1 | D2 | T5 | T6 | T7 |
|---|---|---|---|---|---|---|---|
| KV 40° C. | ISO 3104 | mm²/s | 10.46 | 9.84 | 11.11 | 10.1 | 20.75 |
| KV100° C. | ISO 3104 | mm²/s | 2.91 | 2.81 | 2.80 | 2.81 | 4.36 |
| Four-ball "wear" test average wear diameter | ASTM D4172 | mm | 0.41 | 0.38 | 0.45 | 0.42 | 0.37 |
| Four-ball "extreme pressure" test | ASTM D2783 | | | | | | |
| Last load before seizure | | kg | 100 | 100 | 63 | 80 | 126 |
| Weld load | | kg | 500 | 500 | 400 | 500 | 620 |
| LWI: (load wear index) | | kg | 87 | 84 | 69.5 | 84 | 98 |
| Foaming - sequence I | ISO 6247 | ml/ml | 50/0 | 90/0 | >600 | 30/0 | >500/0 |

T5 = naphthenic oil, T6 = white mineral oil, T7 = 85NS oil

Silicone Sealants Composition:

This example describes the use of diluents according to the invention in silicone sealants, particularly in the silicone sealants RTV-1 (Room Temperature Vulcanizable—1 component). The following table shows the typical composition of this type of sealant (% by weight):

| | |
|---|---|
| Silicone polymer | 51.15% |
| Plasticizer | 34.10% |
| silicone oil | q.s. |
| hydrocarbon solvent | HC % |
| Cross-linking agent | 4.74% |
| silica | 10.00% |
| catalyst | 0.01% |

In this composition, the polymer:plasticizer ratio is 1.5:1 and the sum of the hydrocarbon solvent (HC %)+silicone oil (q.s.) is equal to 34.1% by weight.

In Table 5 below, the level of hydrocarbon solvent is varied from 10 to 20% by weight, then a bead of sealant is applied to an absorbent paper, the cross-linked sealant is thus stored at low temperature (+5° C.) for a week, then the absorbent paper is observed and, in particular around the bead of sealant, the presence of any "halo" which results from bleeding of the hydrocarbon solvent and therefore poor compatibility with the polymer.

TABLE 5

| | Hydrocarbon (HC) solvent content | | |
|---|---|---|---|
| | 10% | 15% | 20% |
| T4 | Slight bleeding | Significant bleeding | Significant bleeding |
| D6 | No bleeding | No bleeding | No bleeding |
| D7 = 40% T4 + 60% D6 | No bleeding | No bleeding | Very slight bleeding |

These tests are repeated with a content of 20% by weight hydrocarbon solvent at a temperature of −18° C., the results shown in Table 6 are obtained:

TABLE 6

| | Hydrocarbon (HC) isolvent content 20% |
|---|---|
| T4 | Very significant bleeding |
| D6 | Very slight bleeding |
| D7 | Slight bleeding |

The comparative results for the fluids D6 and D7 within the meaning of the invention (pour point −48° C. and −20° C.) and a fluid T4 of the prior art (pour point+2° C.) clearly show less bleeding of the hydrocarbon solvents D6 and D7 reflecting a better compatibility with the polymer, the three fluids D6, D7 and T4 having a similar distillation range and viscosity at 40° C.

The invention claimed is:

1. Hydrocarbon fluid which can be used in the composition of industrial and agricultural products, or products for domestic use, the hydrocarbon fluid comprising a pour point of less than −15° C. according to ASTM standard D97, initial and final boiling points comprised between 200 and 450° C., more than 50% by weight isoparaffins and between 20 and 40% by weight of naphthenes, and constituted by a mixture of hydrocarbons obtained by distillation of hydrodewaxed gas-oil cuts of fossil origin with a boiling point greater than 200° C.

2. The fluid according to claim 1, wherein its boiling point is comprised between 280 and 450° C., or between 200 and 325° C.

3. The fluid according to claim 1, wherein its pour point is less than −30° C. according to ASTM standard D 97.

4. The fluid according to claim 1, wherein its sulphur content is less than 10 ppm.

5. The fluid according to claim 1, wherein it originates from the hydrodewaxing of gas-oil type cuts obtained by atmospheric distillation, vacuum distillation, hydrotreatment, hydrocracking, catalytic cracking and/or visbreaking, optionally after an additional treatment of desulphurization and/or removal of aromatics.

6. The fluid according to claim 1, wherein the viscosity of the fluids with a boiling point comprised between 280 and 450° C., is greater than 5 mm²/s at 40° C. according to ASTM standard D445.

7. The fluid according to claim 6, wherein it comprises less than 65% by weight hydrocarbons having a chain length comprised between 16 and 22 carbon atoms, and more than 30% by of weight hydrocarbons having a chain length greater than 22 carbon atoms.

8. The fluid according to claim 6, wherein it comprises less than 50% by weight hydrocarbons having a chain length comprised between 16 and 22 carbon atoms, and more than 40% by weight hydrocarbons having a chain length greater than 22 carbon atoms.

9. The fluid according to claim 6, wherein it is devoid of normal paraffins.

10. The fluid according to claim 1, wherein the viscosity of the fluids with a boiling point comprised between 200 and 325° C. is less than 3.5 mm²/s at 40° C., according to ASTM standard D445 and in that it contains no hydrocarbons with carbon chains greater than C22.

11. A composition comprising:
hydrocarbon fluids comprising a pour point of less than −15° C. according to ASTM standard D97, initial and final boiling points comprised between 200 and 450° C. containing, more than 50% by weight isoparaffins and between 20 and 40% by weight of naphthenes, and constituted by a mixture of hydrocarbons obtained by distillation of hydrodewaxed gas-oil cuts of fossil origin with a boiling point greater than 200° C.;
in combination with non-hydrodewaxed fluids, wherein the non-hydrodewaxed hydrocarbons originate from
hydrocracked and/or hydrotreated cuts comprised between 200 and 400° C., with a cut range less than or equal to 70° C., and naphthenese content greater than 40% by weight and/or
severely hydrotreated gas-oils from distillation cuts comprised between 200 and 350° C. and with a sulphur content of less than 10 ppm.

12. The composition of hydrocarbon fluids according to claim 11, further comprising at least 40% by weight hydrocarbon fluid.

13. A hydrocarbon fluid for industrial, agricultural, and household products comprising a pour point of less than −15° C. according to ASTM standard D97, initial and final boiling points comprised between 200 and 450° C. containing, more than 50% by weight isoparaffins and between 20 and 40% by weight of naphthenes, and comprising a mixture of hydrocarbons obtained by distillation of hydrodewaxed gas-oil cuts of fossil origin with a boiling point greater than 200° C.; alone or in a mixture with non-hydrodewaxed fluids.

14. A drilling fluid comprising at least one hydrocarbon fluid according to claim 1, or a composition from a cut with boiling points comprised between 200 and 350° C.

15. A composition of phytosanitary products comprising at least one hydrocarbon fluid according to claim 1, or a composition from a cut with boiling points comprised between 300 and 450° C.

16. A lubricating oil for metal working comprising at least one hydrocarbon fluid according to claim 1, or a composition from a cut with boiling points comprised between 280 and 450° C.

17. A solvent for resins and/or polymers comprising at least one hydrocarbon fluid according to claim 1, or a composition from a cut with boiling points comprised between 280 and 400° C., the final composition comprising from 5 to 95% by weight of the fluid.

18. A composition for silicone sealants or silicone adhesives comprising at least one hydrocarbon fluid according to claim 1, or a composition from a cut with boiling points comprised between 280 and 380° C.

19. A fluid for use in formulations based on polyvinyl chloride (PVC) for producing building materials comprising at least one hydrocarbon fluid according to claim 1, or a composition from a cut with boiling points comprised between 290° C. and 400° C.

20. A composition of offset inks, in admixture with strongly oxidized bituminous compounds comprising at least one hydrocarbon fluid according to claim 1, or a composition from a cut with boiling points comprised between 290° C. and 380° C.

21. A composition for domestic fuels comprising at least one hydrocarbon fluid according to claim 1, or a composition from a cut with boiling points comprised between 280 and 400° C.

22. The fluid according to claim 1, containing less than 500 ppm of aromatics determined by UV spectrometry.

23. The fluid according to claim 1, wherein it contains more than 60% by weight isoparaffins.

24. The fluid according to claim 1, wherein it comprises more than 60% by weight of isoparaffins and less than 10% by weight of normal paraffins.

* * * * *